US012435966B2

(12) United States Patent
Toulon et al.

(10) Patent No.: US 12,435,966 B2
(45) Date of Patent: Oct. 7, 2025

(54) METHOD FOR DETERMINING THE ANGULAR POSITION OF A SHAFT OF A MOTOR VEHICLE

(71) Applicant: Continental Automotive Technologies GmbH, Hannover (DE)

(72) Inventors: Dariga Toulon, Toulouse (FR); Thierry Chauchard, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 154 days.

(21) Appl. No.: 18/514,335

(22) Filed: Nov. 20, 2023

(65) Prior Publication Data

US 2024/0167805 A1 May 23, 2024

(30) Foreign Application Priority Data

Nov. 23, 2022 (FR) ...................................... 2212182

(51) Int. Cl.
*G01B 7/30* (2006.01)
*G01B 7/00* (2006.01)

(52) U.S. Cl.
CPC ............... *G01B 7/30* (2013.01); *G01B 7/003* (2013.01)

(58) Field of Classification Search
CPC . G01B 7/003; G01B 7/30; G01D 3/02; G01D 5/145; G01D 5/24476; G01D 2205/24
See application file for complete search history.

(56) References Cited

U.S. PATENT DOCUMENTS

| 11,555,716 B1* | 1/2023 | Rigoni | G01D 5/204 |
| 2016/0169707 A1 | 6/2016 | Hirota et al. | |
| 2018/0292197 A1* | 10/2018 | Furukawa | G01D 3/02 |
| 2019/0031046 A1* | 1/2019 | Secrest | H02P 6/16 |
| 2022/0187387 A1* | 6/2022 | Casu | G01R 33/0029 |
| 2022/0364891 A1* | 11/2022 | Hammerschmidt | G01D 5/14 |
| 2023/0030663 A1 | 2/2023 | Trinh et al. | |
| 2024/0044673 A1* | 2/2024 | Toulon | G01D 5/145 |

FOREIGN PATENT DOCUMENTS

| FR | 3 104 856 A1 | 6/2021 |
| JP | H04-096131 A | 3/1992 |

OTHER PUBLICATIONS

Preliminary Research Report and Written Opinion on the Patentability of the Invention issued Dec. 8, 2023, by the French Patent Office in corresponding France Patent Application No. 2302449. (9 pages).

* cited by examiner

*Primary Examiner* — Eman A Alkafawi
*Assistant Examiner* — Suresh K Rajaputra
(74) *Attorney, Agent, or Firm* — Buchanan Ingersoll & Rooney PC

(57) ABSTRACT

A method for determining the angular position of a shaft of a motor vehicle. The method includes calculating the mean angular resolution; calculating the time at which the cosine signal passes through zero; using the time at which the sine signal passes through zero and the mean angular resolution; determining the measured angle at the calculated time at which the cosine signal passes through zero; calculating the amplitude of the second harmonic of the measured angle signa;, calculating a second-harmonic error from the calculated amplitude of the second harmonic; and calculating a compensated angle representing the corrected angular position of the shaft from the real-time measured angle and from the calculated second-harmonic error.

9 Claims, 3 Drawing Sheets

METHOD FOR DETERMINING THE ANGULAR POSITION OF A SHAFT OF A MOTOR VEHICLE

CROSS REFERENCE TO RELATED APPLICATIONS

This application claims priority to French Patent Application No. 2212182, filed Nov. 23, 2022, the contents of such application being incorporated by reference herein.

TECHNICAL FIELD

The present invention relates to the field of shaft position sensors in a motor vehicle and more particularly concerns a method for measuring the angular position of a rotating shaft of a motor vehicle by means of a target fixed at a free end of said shaft and of a position sensor mounted facing said target, together with a system suitable for implementing said method.

BACKGROUND OF THE INVENTION

It is currently known practice to use a so-called "position" sensor in a motor vehicle in order to measure the angular position of a shaft relative to a reference position. For example, it is known practice to measure the angular position of a crankshaft or camshaft of an internal combustion engine in order to determine the timings for the injection of fuel into the cylinders or measure the position of a rotor shaft in an electric machine in order to control it.

As is known, the sensor is mounted facing a free end of the shaft, in the center of which is mounted a magnetic target. The sensor uses the electromagnetic response of the target to generate a sine signal and a cosine signal representative of the angular variations of the target relative to the sensor when the shaft is rotating and the arc tangent of which makes it possible to obtain an angle value signal giving the angular position of the shaft relative to the reference position. This sensor may for example be a TMR (Tunneling MagnetoResistive), GMR (Giant MagnetoResistive), or AMR (Anisotropic MagnetoResistive) sensor or a Hall-effect sensor.

In one known solution, the sensor comprises an electronic circuit on which are mounted a first Wheatstone bridge making it possible to generate the sine signal and a second Wheatstone bridge making it possible to generate the cosine signal. In the case of an AMR sensor, the first Wheatstone bridge and the second Wheatstone bridge are mechanically offset by an angle of 45°. In the case of a GMR or TMR sensor, the first Wheatstone bridge and the second Wheatstone bridge are mechanically offset by an angle of 90°, An eccentricity tolerance is permitted when the sensor is being mounted relative to the center of the target. Likewise, an angularity tolerance is permitted between the electronic circuit and the target, which should ideally be parallel. However, these tolerances result in an error in the value of the angular position delivered by the sensor. In particular, the more the sensor is offset relative to the center of the target, and therefore from the axis of rotation of the shaft, the more the angular error increases.

FIG. 1 shows the variation in the error Err (in degrees) observed between the calculated angle and the actual angle (in degrees) as a function of the actual angle ANG (in degrees) of the shaft. It can be seen that the error Err between the calculation performed by the sensor and the actual angular position ANG of the shaft can be up to approximately plus or minus 8°.

One solution would consist in ensuring the centered, parallel placement of the sensor and of the target, but the mounting constraints on production lines always involve tolerances, FIG. 2 shows the error Err (in degrees) observed between the calculated angle and the actual angle (in degrees) as a function of the actual angle ANG (in degrees) of the shaft. It can be seen that the error Err between the calculation performed by the sensor and the actual angular position ANG of the shaft can be up to approximately plus or minus 0.12° for an eccentricity offset of 0.25 mm. Another solution consists in processing the angle value signal by filtering in order to reduce the error. However, the effectiveness of such processing can prove to be limited, in particular as it works correctly only at one fixed frequency. In addition, processing the angle value signal by filtering requires significant processing capacity, in terms of both hardware and software, which is another drawback.

It would therefore be advantageous to propose a solution that makes it possible to at least partly overcome these drawbacks.

SUMMARY OF THE INVENTION

To this end, an aspect of the invention firstly relates to a method for determining the angular position of a shaft of a motor vehicle by means of a target fixed to a free end of said shaft and comprising a magnetic element, and of a magnetoresistive position sensor mounted facing said target, said method comprising:
   at each instant: rotating the shaft, generating a sine signal, storing the values of the sine signal in a first memory zone, generating a cosine signal, storing the values of the cosine signal in a second memory zone, calculating a so-called real-time "measured" angle from the sine and cosine signals representing the angular position of the shaft, and storing the calculated measured angle in a third memory zone,
   over one period of the sine and cosine signals:
   determining the measured angle as the sine signal passes through zero, preferably from positive to negative,
   determining the time at which the sine signal passes through zero,
   calculating the mean angular resolution, said mean angular resolution corresponding to the derivative, with respect to time, of the determined measured angle,
   calculating the time at which the cosine signal passes through zero, preferably from negative to positive, using the time at which the sine signal passes through zero and the mean angular resolution,
   determining the measured angle at the calculated time at which the cosine signal passes through zero,
   calculating the amplitude of the second harmonic of the measured angle signal from the measured angle determined at the time at which the sine signal passes through zero, and from the measured angle determined at the calculated time at which the cosine signal passes through zero,
   calculating a second-harmonic error from the calculated amplitude of the second harmonic,
   calculating a compensated angle representing the corrected angular position of the shaft from the real-time measured angle and from the calculated second-harmonic error.

By determining the harmonic angular error due in part to the eccentricity of the sensor with respect to the axis of rotation of the shaft, an aspect of the invention makes it possible to incorporate said harmonic error into a calculation making it possible to compensate for the imperfections of the system and thus significantly reduce the error incurred in determining the angle. Furthermore, the method according to an aspect of the invention requires only a small processing capability, thereby limiting hardware and memory costs.

One obvious solution for at least partially overcoming the drawbacks of the prior art might have been to process the signal using a Fast Fourier Transform, but such a solution would require significant processing capability in the electronic control unit.

As a preference, the compensated angle $$\theta_{compensated} \quad [\text{Math 1}]$$

representing the corrected angular position of the shaft is calculated using the following formula:

$$\theta_{compensated} = \theta_{measured} + Err_{harmonic} \quad [\text{Math 2}]$$

where $$\theta_{measured} \quad [\text{Math 3}]$$

is the measured angle, and $$Err_{harmonic} \quad [\text{Math 4}]$$

is the second-harmonic error.

As a preference, the mean angular resolution is calculated using the following formula:

$$Res_{angular} = \frac{\Delta\theta_{measured}}{\Delta t} \quad [\text{Math 5}]$$

where $$Res_{angular} \quad [\text{Math 6}]$$

is the angular resolution, $\Delta t$ is the time interval between two measurements and $$\Delta\theta_{measured} \quad [\text{Math 7}]$$

is the difference between the angles measured at two successive times.

As a preference, the time X2 at which the cosine signal passes through zero is calculated using the following formula:

$$X2 = X1 + \frac{90}{Res_{angular}} \quad [\text{Math 8}]$$

where X1 is the time at which the sine signal passes through zero from positive to negative, and $$Res_{angular} \quad [\text{Math 9}]$$

is the mean angular resolution.

As a preference, the amplitude of the second harmonic of the measured angle signal is calculated using the following formula:

$$Amp_{harmonic} = \frac{\theta_{X1} + 90 - \theta_{X2}}{2} \quad [\text{Math 10}]$$

where $$\theta_{X1} \quad [\text{Math 11}]$$

is the angle determined at the time X1 at which the sine signal passes through zero, and $$\theta_{X2} \quad [\text{Math 12}]$$

is the angle determined at the time X2 at which the cosine signal passes through zero.

As a preference, the second-harmonic error $$Err_{harmonic} \quad [\text{Math 13}]$$

as a function of time t is calculated using the following formula:

$$Err_{harmonic}(t) = Amp_{harmonic} \cos(2\omega t) \quad [\text{Math 14}]$$

where $$Amp_{harmonic} \quad [\text{Math 15}]$$

is the amplitude of the second harmonic and $\omega$ is the angular velocity of the shaft (where $\omega = (360/Res_{angular})$).

As a preference, the crossing detected for the cosine signal passing through 0 is a crossing of the amplitude of said cosine signal from negative to positive.

An aspect of the invention also relates to a computer program product characterized in that it contains a set of program code instructions that, when they are executed by one or more processors, configure the one or more processors to implement a method as set out above.

An aspect of the invention also relates to a system for determining the angular position of a shaft of a motor vehicle by means of a target fixed to a free end of said shaft and comprising a magnetic element, and of a magnetoresistive position sensor mounted facing said target, said system comprising said sensor, said sensor being configured to generate a sine signal and a cosine signal representative of the angular position of the shaft, the system being configured to:

at each instant, generate a sine signal, store the values of the sine signal in a first memory zone, generate a cosine signal, store the values of the cosine signal in a second memory zone, calculate a so-called real-time "measured" angle from the sine and cosine signals representing the angular position of the shaft, and store the calculated measured angle in a third memory zone, determine the measured angle as the sine signal passes through zero, determine the time at which the sine signal passes through zero, calculate the mean angular resolution, calculate the time at which the cosine signal passes through zero, using the time at which the sine signal passes through zero and the mean angular resolution, determine the measured angle at the calculated time at which the cosine signal passes through zero, calculate the amplitude of the second harmonic of the measured angle signal from the measured angle determined at the time at which the sine signal passes through zero, and from the measured angle determined at the calculated time at which the cosine signal passes through zero, calculate a second-harmonic error from the calculated amplitude of the second harmonic, calculate a compensated angle representing the corrected angular position of the shaft from the real-time measured angle and from the calculated second-harmonic error.

As a preference, the system is configured to calculate the compensated angle representing the corrected angular position of the shaft is calculated using the following formula:

$$\theta_{compensated} = \theta_{measured} + Err_{harmonic} \quad \text{[Math 16]}$$

where $$\theta_{measured} \quad \text{[Math 17]}$$

is the measured angle, and $$Err_{harmonic} \quad \text{[Math 18]}$$

is the second-harmonic error.

Advantageously, the system is configured to calculate the mean angular resolution using the following formula:

$$Res_{angular} = \frac{\Delta\theta_{measured}}{\Delta t} \quad \text{[Math 19]}$$

where $$Res_{angular} \quad \text{[Math 20]}$$

is the angular resolution, Δt is the time interval between two measurements and $$\Delta\theta_{measured} \quad \text{[Math 21]}$$

is the difference between the angles measured at two successive times.

Advantageously, the system is configured to calculate the time X2 at which the cosine signal passes through zero using the following formula:

$$X2 = X1 + \frac{90}{Res_{angular}} \quad \text{[Math 22]}$$

where X1 is the time at which the sine signal passes through zero, and $$Res_{angular} \quad \text{[Math 23]}$$

is the mean angular resolution,

Advantageously, the system is configured to calculate the amplitude of the second harmonic of the measured angle signal using the following formula:

$$Amp_{harmonic} = \frac{\theta_{X1} + 90 - \theta_{X2}}{2} \quad \text{[Math 24]}$$

where $$\theta_{X1} \quad \text{[Math 25]}$$

is the angle determined at the time X1 at which the sine signal passes through zero, and $$\theta_{X2} \quad \text{[Math 26]}$$

is the angle determined at the time X2 at which the cosine signal passes through zero.

Advantageously, the system is configured to calculate the second-harmonic error using the following formula:

$$Err_{harmonic}(t) = Amp_{harmonic} \cos(2\omega t) \quad \text{[Math 27]}$$

where $$Amp_{harmonic} \quad \text{[Math 28]}$$

is the amplitude of the second harmonic and ω is the angular velocity of the shaft (where $\chi = (360/Res_{angular})$).

As a preference, the target comprises a magnetic element in the shape of a cylinder of circular cross section.

Advantageously, the system is configured to detect the passing of the compensated sine signal through 0 by detecting a crossing of the amplitude of said signal from positive to negative.

As a preference, the system is configured to store the compensated final-angle values in a memory zone different from the preceding zones.

As a preference, the system is configured to send a fault message when the difference between the compensated final-angle value calculated at said instant and the real-time measured-angle value stored at said instant is greater than a predetermined warning threshold.

An aspect of the invention also relates to a motor vehicle comprising a drive shaft and a system as set out above.

BRIEF DESCRIPTION OF THE DRAWINGS

Other features and advantages of aspects of the invention will become more apparent upon reading the description that follows. This description is purely illustrative and is to be read with reference to the appended drawings, in which.

DETAILED DESCRIPTION OF THE PREFERRED EMBODIMENTS

Figure 1:
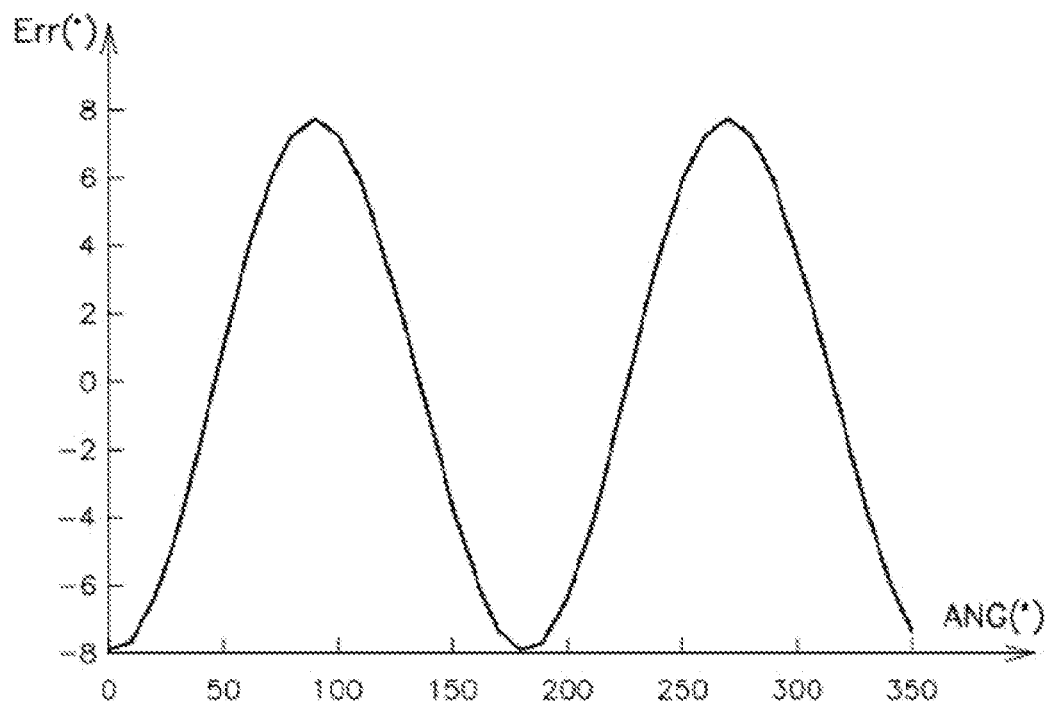
FIG. 1 illustrates an example of a signal representing the error between the angular position of a shaft as calculated by a position sensor and the actual angle of the shaft in the absence of correction.
Figure 2:
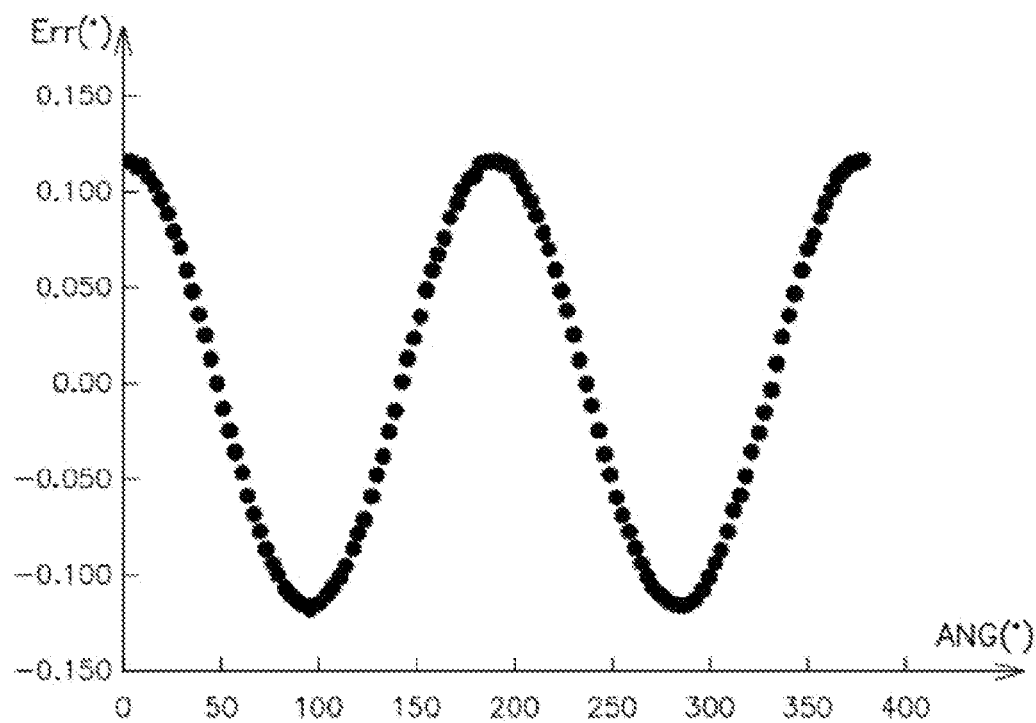
FIG. 2 illustrates an example of a signal representing the error between the angular position of a shaft as calculated by a position sensor and the actual angle of the shaft with an eccentricity offset of 0.25 mm.
Figure 3:
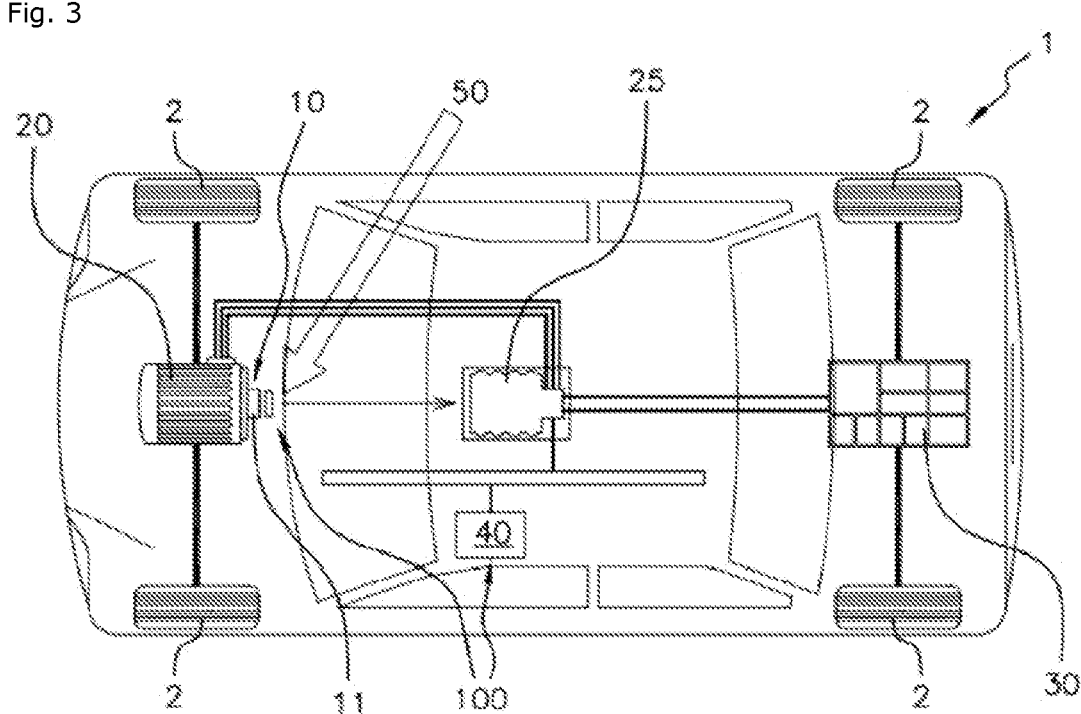
FIG. 3 schematically illustrates one embodiment of the system according to the invention.

FIG. 3 shows an example of a vehicle 1 according to an aspect of the invention.

In this non-limiting example, the vehicle 1 is an electric vehicle comprising an electric drive machine comprising a rotor 10 and a stator 20. The electric machine is powered by an electric battery 30 and is controlled by an electronic control unit 40 via a converter 25 and using a sensor 50.

The rotor 10 comprises a rotating central shaft 11 making it possible to drive the wheels 2 of the vehicle 1 via a drivetrain (not shown for the sake of clarity). It will be noted that in this example, the shaft 11 is a shaft of a rotor 10 but this in no way limits the scope of an aspect of the present invention, and the shaft 11 can be any type of rotating shaft of a motor vehicle.

Figure 4:
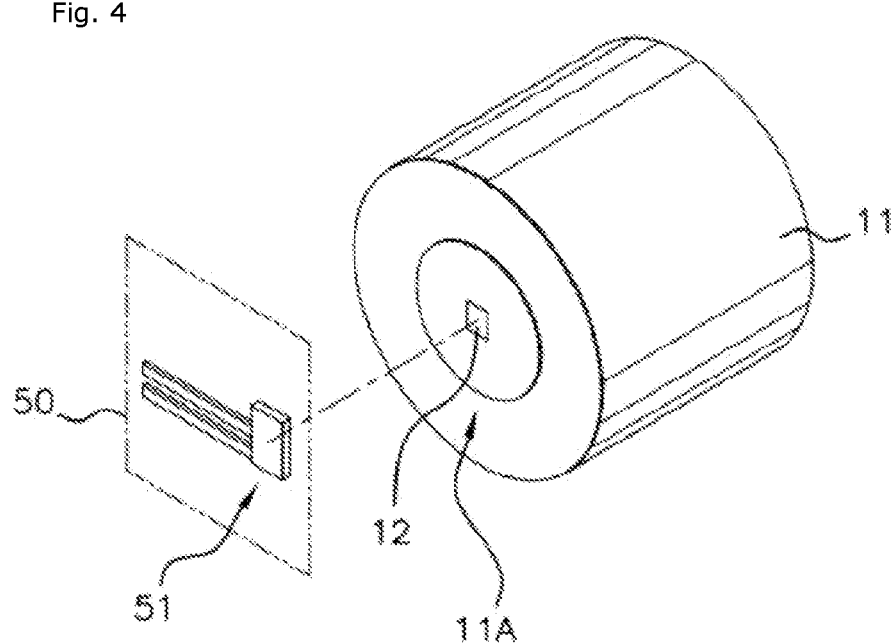
FIG. 4 schematically illustrates one arrangement of the position sensor and drive shaft.

With reference to FIG. 4, the shaft 11 takes the form of a rod extending in a longitudinal direction from the body of the rotor 10 and comprising a free end 11A. In this example, the shaft 11 is a transmission shaft, but it could equally be, in one embodiment, a crankshaft, a camshaft, a steering shaft or any shaft of the vehicle 1 the angular position of which must be measured, for example in order to allow the satisfactory operation of the motor of the vehicle 1.

The free end 11A of the shaft 11 comprises a target 12, taking the form of a disk for example, mounted coaxially with the shaft 11, that is, the center of the target 12 is coincident with the longitudinal axis of the shaft 11. The target 12 comprises a centered magnetic element at its center. This magnetic element can be a portion of the target 12 or an additional element fixed in the center of the target 12. As a preference, the magnetic element takes the form of a cylinder of circular cross section.

The vehicle 1 also comprises a system 100 according to an aspect of the invention.

In this example, the system 100 comprises the electronic control unit 40, the sensor 50 and a plurality of memory zones (not visible) that can be implemented in the electronic control unit 40 and/or in the sensor 50 and/or in another location in the system 100.

The sensor 50 is preferably a magnetoresistive sensor, for example a TMR (tunneling magnetoresistive) sensor or a Hall-effect sensor. The sensor 50 is mounted facing the magnetic element of the target 12 of the shaft 11, substantially centered and coaxial therewith.

The sensor 50 is configured to generate a sinusoidal signal, known as a sine signal, and a cosinusoidal signal, known as a cosine signal, representative of the electromagnetic variations of the magnet when the shaft 11 is rotated.

The system 100, which is to say the sensor 50 and/or the electronic control unit 40 is configured so as to, at each instant and in a manner known per se: generate a sine signal, store the values of the sine signal in a first memory zone, generate a cosine signal, store the values of the cosine signal in a second memory zone, calculate a so-called real-time "measured" angle from the sine and cosine signals representing the angular position of the shaft, and store the calculated measured angle in a third memory zone.

Advantageously, the system 100, which is to say the electronic control unit 40 and/or the sensor 50, may be configured to, at each instant, compensate for the amplitude and offset of the signals generated by the sensor, to store the compensated sine signal values in a first memory zone, to store compensated cosine signal values in a second memory zone, to calculate the so-called "measured" angle in real time using the compensated sine and cosine signals, and to store the measured angle calculated in a third memory zone.

The system 100 is configured to determine the time at which the sine signal passes through zero, preferably by detecting a crossing from negative to positive.

The system 100 is configured to determine the measured angle at the determined time at which the sine signal passes through zero.

The system 100 is configured to calculate the mean angular resolution, preferably using the following formula:

$$Res_{angular} = \frac{\Delta \theta_{measured}}{\Delta t}$$ [Math 29]

where $Res_{angular}$ [Math 30]

is the angular resolution, $\Delta t$ is the time interval between two measurements and $\Delta \theta_{measured}$ [Math 31]

is the difference between the angles measured at two successive times.

The system 100 is configured to calculate the time at which the cosine signal X2 passes through zero using the time X1 at which the sine signal passes through zero and the mean angular resolution, preferably using the following formula:

$$X2 = X1 + \frac{90}{Res_{angular}}$$ [Math 32]

where X1 is the time at which the sine signal passes through zero, and $Res_{angular}$ [Math 33]

is the mean angular resolution.

The system 100 is configured to determine the measured angle at the determined time at which the cosine signal passes through zero.

The system 100 is configured to calculate the amplitude of the second harmonic of the measured angle signal from the measured angle determined at the time at which the sine signal passes through zero, and from the measured angle determined at the calculated time at which the cosine signal passes through zero, preferably using the following formula:

$$Amp_{harmonic} = \frac{\theta_{X1} + 90 - \theta_{X2}}{2}$$ [Math 34]

where $\theta_{X1}$ [Math 35]

is the angle determined at the time at which the sine signal passes through zero, and $\theta_{X2}$ [Math 36]

is the angle calcuated at the time at which the cosine signal passes through zero.

The system 100 is configured to calculate a second-harmonic error from the calculated amplitude of the second harmonic, preferably using the following formula:

$Err_{harmonic}(t) = Amp_{harmonic} \cos(2\omega t)$ [Math 37]

where $Amp_{harmonic}$ [Math 38]

is the amplitude of the second harmonic, and $\omega$ is the angular velocity of the shaft.

The system 100 is configured to calculate a compensated angle representing the corrected angular position of the shaft from the real-time measured angle and from the calculated second-harmonic error, preferably using the following formula:

$\theta_{compensated} = \theta_{measured} + Err_{harmonic}$ [Math 39]

where $\theta_{measured}$ [Math 40]

is the measured angle, and $Err_{harmonic}$ [Math 41]

is the second-harmonic error.

"At each instant" is given to mean continuously or in real time, electronically by periodic time samples, in a manner known per se, for example every N milliseconds where N is a natural number.

The system 100 comprises at least one processor capable of implementing a set of instructions allowing these functions to be performed.

EXAMPLE OF AN EMBODIMENT

Figure 5:
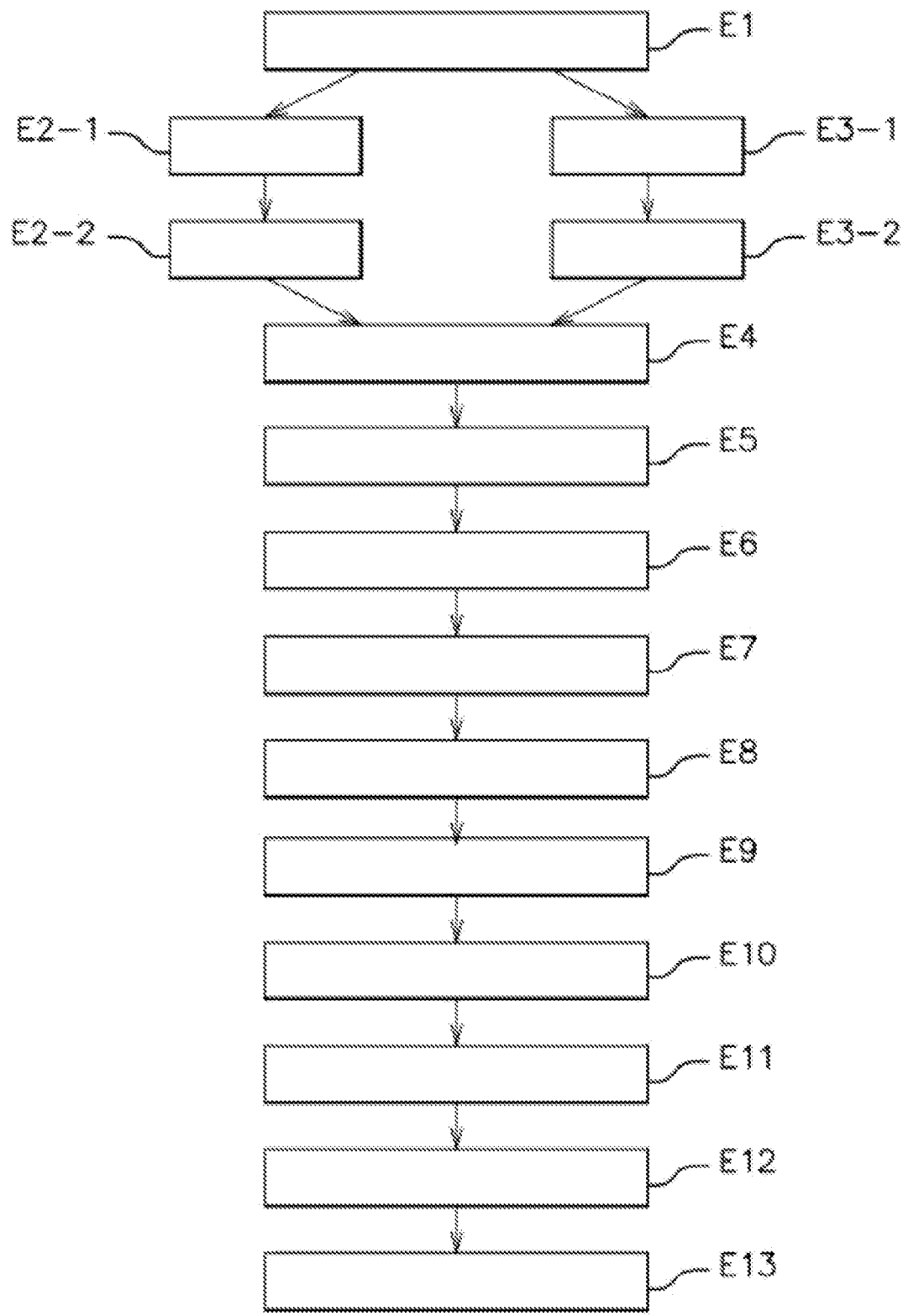
FIG. 5 schematically illustrates one embodiment of the method according to the invention.

An exemplary embodiment of the method according to the invention will now be described with reference to FIG. 5.

First, the shaft 11 is rotated in a step E1.

As soon as the shaft 11 begins to rotate, at each instant, the sensor 50 starts to generate a sine signal and a cosine signal in a step E2.

As the shaft 11 gradually rotates and the sine and cosine signals are generated, each value of the measured compensated sine signal is stored in a first memory zone of the system 100 in a step E3-1 and each value of the measured compensated cosine signal is stored in a second memory zone of the system 100 in a step E3-2. The so-called real-time "measured" angle is calculated by the system 100 in real time from the compensated sine and cosine signals in a step E4. The measured angle is determined by calculating the arc tangent of the compensated sine and cosine signals.

As a preference, the first angle-value signal is generated by taking the arc tangent of the ratio between the value of the first sine signal and the value of the first cosine signal, and the second angle-value signal is generated by taking the arc tangent of the ratio between the value of the second sine signal and the value of the second cosine signal, The calculated measured angle is stored in a third memory zone of the system 100 in a step E5.

As the shaft begins to rotate, the system will perform the following series of tasks at least during the course of the first rotation of the shaft 11 and possibly periodically thereafter as the shaft rotates, for example on each rotation.

The system 100 detects the passage of the sine signal through zero from positive to negative and determines the measured angle during said crossing through zero, in a step E6.

The system 100 determines the time at which the sine signal passes through zero in a step E7 and calculates the mean angular resolution in a step E8 by calculating the derivative, with respect to time, of the determined measured angle.

The system 100 in a step E9, calculates the time at which the cosine signal passes through zero, from negative to positive, using the determined time at which the sine signal passes through zero and the calculated mean angular resolution.

The system 100, in a step E10, obtains the value for the angle at the time, determined previously, at which the cosine signal passes through zero.

The system 100 next, in a step E11, calculates the amplitude of the second harmonic of the measured angle signal from the measured angle determined at the time at which the sine signal passes through zero, and from the measured angle determined at the calculated time at which the cosine signal passes through zero.

Once this harmonic amplitude has been determined, the system 100 in a step E12 determines the harmonic error at each instant of the measurement by multiplying said harmonic amplitude by the cosine of twice the angular velocity of the shaft multiplied by the time concerned.

Finally, the system 100 adds this harmonic error to the measured angle in a step E13 to obtain a compensated angle value, and then stores the compensated angle in a fourth memory zone.

As set out above, steps E2-1 to E13 can be implemented entirely by the sensor 50 or entirely by the electronic control unit 40, As a variant, some of steps E2-1 to E13 can be implemented by the sensor 50 and the subsequent steps by the electronic control unit 40.

The method according to an aspect of the invention makes it possible to correct the error generated by a misalignment and/or a lack of parallelism between the position sensor 50 and the target 12 by compensating for the deficiencies of the angle-value signal by using a harmonic error to eliminate the second harmonic in order to calculate a compensated angular position of the shaft 11 which substantially corresponds to the actual angular position of said shaft 11.

The invention claimed is:

1. A method for determining an angular position of a shaft of a motor vehicle by a target fixed to a free end of said shaft and comprising a magnetic element, and of a magnetoresistive position sensor mounted facing said target, said method comprising: at each instant: rotating the shaft, generating a sine signal, storing the values of the sine signal in a first memory zone, generating a cosine signal, storing the values of the cosine signal in a different memory zone, calculating a real-time "measured" angle from the sine and cosine signals representing the angular position of the shaft, storing the calculated measured angle in a memory zone different from the preceding zones, over one period of the sine and cosine signals: determining the measured angle as the sine signal passes through zero, determining the time at which the sine signal passes through zero, calculating the mean angular resolution, said mean angular resolution corresponding to the derivative, with respect to time, of the determined measured angle, calculating the time at which the cosine signal passes through zero, using the time at which the sine signal passes through zero and the mean angular resolution, determining the measured angle at the calculated time at which the cosine signal passes through zero, calculating the amplitude of the second harmonic of the measured angle signal from the measured angle determined at the time at which the sine signal passes through zero, and from the measured angle determined at the calculated time at which the cosine signal passes through zero, calculating a second-harmonic error from the calculated amplitude of the second harmonic, and calculating a compensated angle representing the corrected angular position of the shaft from the real-time measured angle and from the calculated second-harmonic error.

2. The method as claimed in claim 1, wherein the compensated angle $$\theta_{compensated} \quad \text{[Math 42]}$$

representing the corrected angular position of the shaft is calculated using the following formula:

$$\theta_{compensated} = \theta_{measured} + \text{Err}_{harmonic} \quad \text{[Math 43]}$$

where $$\theta_{measured} \quad \text{[Math 44]}$$

is the measured angle, and $$\text{Err}_{harmonic} \quad \text{[Math 45]}$$

is the second-harmonic error.

3. The method as claimed in claim 1, wherein the mean angular resolution is calculated using the following formula:

$$Res_{angular} = \frac{\Delta\theta_{measured}}{\Delta t} \quad \text{[Math 46]}$$

where $$Res_{angular} \quad \text{[Math 47]}$$

is the angular resolution, $\Delta t$ is the time interval between two measurements and $$\Delta\theta_{measured} \quad \text{[Math 48]}$$

is the difference between the angles measured at two successive times.

4. The method as claimed in claim 1, wherein a time X2 at which the cosine signal passes through zero is calculated using the following formula:

$$X2 = X1 + \frac{90}{Res_{angular}}$$ [Math 49]

where X1 is the time at which the sine signal passes through zero from positive to negative, and $Res_{angular}$ [Math 50]

is the mean angular resolution.

5. The method as claimed in claim 1, wherein the amplitude of the second harmonic of the measured angle signal is calculated using the following formula:

$$Amp_{harmonic} = \frac{\theta_{X1} + 90 - \theta_{X2}}{2}$$ [Math 51]

where $\theta_{X1}$ [Math 52]

is the angle determined at the time X1 at which the sine signal passes through zero, and $\theta_{X2}$ [Math 53]

is the angle determined at the time X2 at which the cosine signal passes through zero.

6. The method as claimed in claim 1, wherein the second-harmonic error $Err_{harmonic}$ [Math 54]

is calculated using the following formula:

$$Err_{harmonic}(t) = Amp_{harmonic} \cos(2\omega t)$$ [Math 55]

where $Amp_{harmonic}$ [Math 56]

is the amplitude of the second harmonic, and ω is the angular velocity of the shaft.

7. A non-transitory computer program product, comprising a set of program code instructions that, when executed by one or more processors, configure the one or more processors to implement a method as claimed in claim 1.

8. A system for determining an angular position of a shaft of a motor vehicle by a target fixed to a free end of said shaft and comprising a magnetic element, and of a magnetoresistive position sensor mounted facing said target, said system comprising said sensor, said sensor being configured to generate a sine signal and a cosine signal representative of the angular position of the shaft, the system being configured to:

at each instant, generate a sine signal, store the values of the sine signal in a first memory zone, generate a cosine signal, store the values of the cosine signal in a second memory zone, calculate a real-time "measured" angle from the sine and cosine signals representing the angular position of the shaft, and store the calculated measured angle in a third memory zone, over one period of the sine and cosine signals: determine the measured angle as the sine signal passes through zero, determine the time at which the sine signal passes through zero, calculate the mean angular resolution, said mean angular resolution corresponding to the derivative, with respect to time, of the determined measured angle, calculate the time at which the cosine signal passes through zero, using the time at which the sine signal passes through zero and the mean angular resolution, determine the measured angle at the calculated time at which the cosine signal passes through zero, calculate the amplitude of the second harmonic of the measured angle signal from the measured angle determined at the time at which the sine signal passes through zero, and from the measured angle determined at the calculated time at which the cosine signal passes through zero, calculate a second-harmonic error from the calculated amplitude of the second harmonic, and calculate a compensated angle representing the corrected angular position of the shaft from the real-time measured angle and from the calculated second-harmonic error.

9. A motor vehicle comprising a drive shaft and a system as claimed in claim 8.

\* \* \* \* \*

UNITED STATES PATENT AND TRADEMARK OFFICE
CERTIFICATE OF CORRECTION

PATENT NO. : 12,435,966 B2
APPLICATION NO. : 18/514335
DATED : October 7, 2025
INVENTOR(S) : Dariga Toulon and Thierry Chauchard Page 1 of 1

It is certified that error appears in the above-identified patent and that said Letters Patent is hereby corrected as shown below:

On the Title Page

Item (57) ABSTRACT the word "angle signa;, calculating" should read -- angle signal; calculating --.

Signed and Sealed this
Sixteenth Day of December, 2025

John A. Squires
*Director of the United States Patent and Trademark Office*